July 20, 1965  R. H. REX  3,196,198
METHOD AND APPARATUS FOR MOLDING PLASTIC ARTICLES
Filed Nov. 13, 1961  2 Sheets-Sheet 2
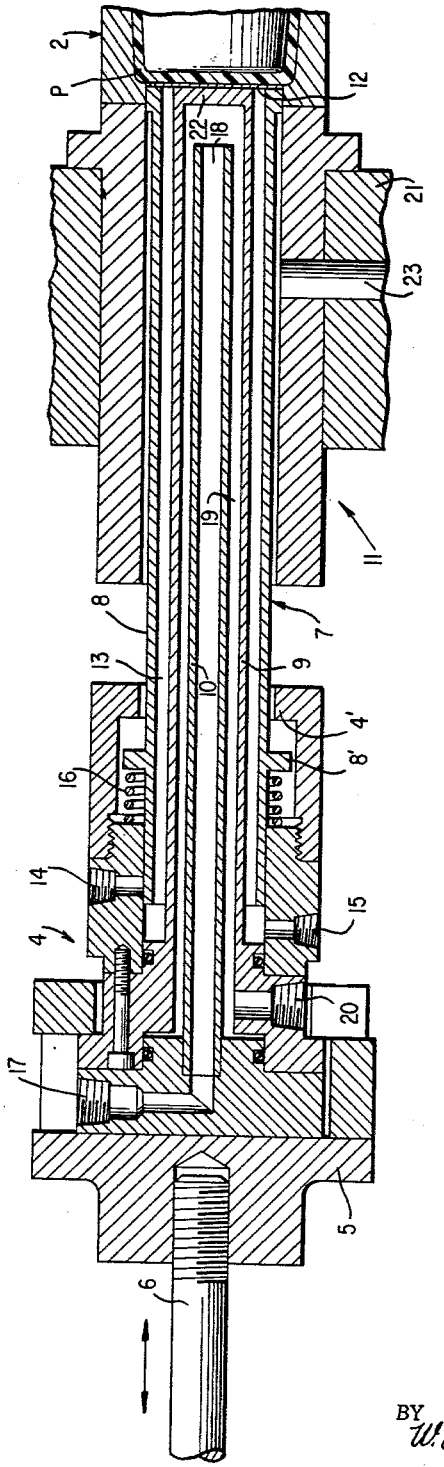
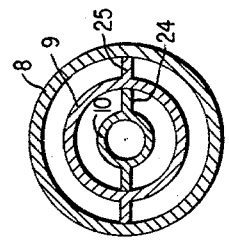
INVENTOR
RAYMOND H. REX
BY *W. A. Schaich & Charles S. Lynch*
ATTORNEYS

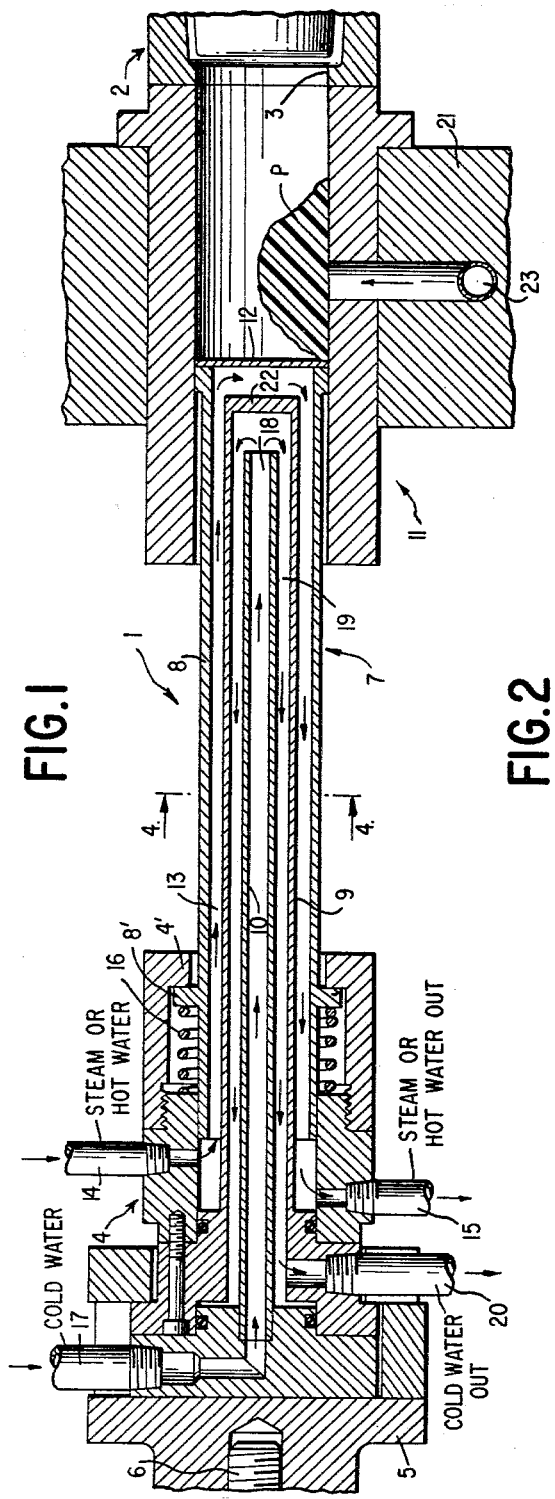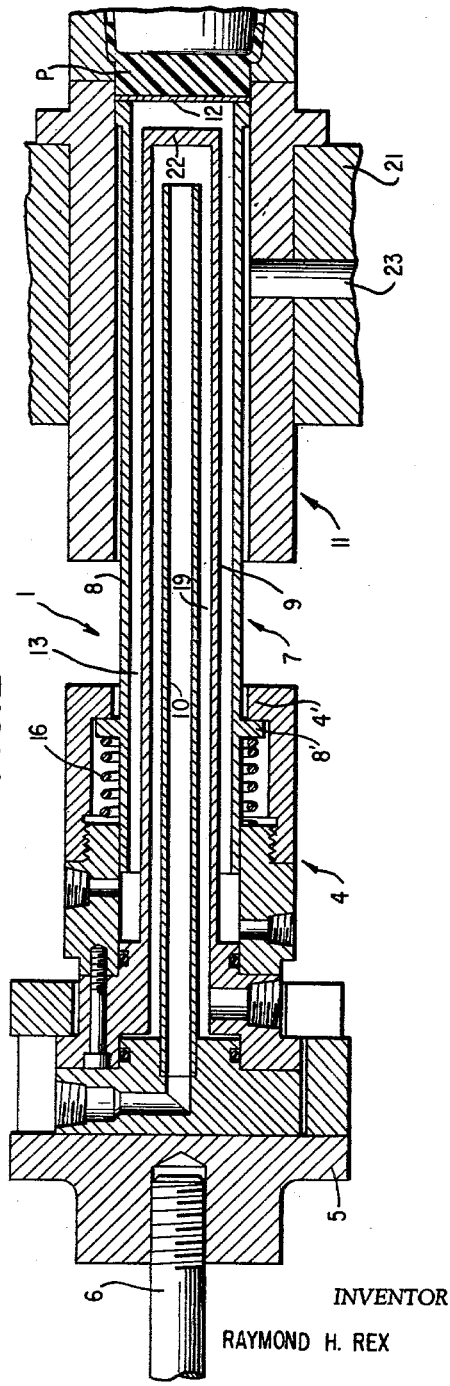

United States Patent Office 3,196,198
Patented July 20, 1965

3,196,198
METHOD AND APPARATUS FOR MOLDING PLASTIC ARTICLES
Raymond H. Rex, Toledo, Ohio, assignor to Owens-Illinois Glass Company, a corporation of Ohio
Filed Nov. 13, 1961, Ser. No. 151,919
10 Claims. (Cl. 264—328)

This invention relates to a method and apparatus for forming plastic articles in which a ram is employed. More specifically this invention is related to a novel ram member to be employed in a plastic molding process.

Apparatus and methods relating to the molding of plastic articles in which a hot plastic charge is fed into a heated chamber from which the charge is moved by a heated hollow ram or plunger into a mold cavity are well known. In making plastic articles, such as containers having bottoms thereto, a frequent practice has been to circulate water heated to 140° F. to 160° F. through the hollow ram to form a clear smooth bottom in the moldings. If the ram is cooler than this when it contacts the charge of plastic, the first points of contact are chilled. Then, as the charge folds over itself and flattens against the ram face, lines and blemishes form where the original chilled sections join. When operating the ram at 140° F. to 160° F. a minimum of 3 seconds ram hold time against the plastic after the molding is formed is necessary, otherwise the bottom distorts.

Accordingly it would be highly desirable in the plastic molding art to provide a method and apparatus whereby plastic articles would be free of the aforementioned blemishes and yet be molded in a shorter cycle by reducing particularly the ram hold time.

It is, therefore, an object of this invention to provide a novel method plastic molding process in which finished articles are formed more rapidly.

A further object of this invention is to provide a novel process wherein blemishes in the finished articles due to folding of the plastic during molding are eliminated.

A further object of this invention is to provide novel apparatus for accomplishing the aforementioned objects.

These and other objects of this invention will become apparent from the description which follows.

In accordance with the present invention a hot plastic charge is introduced into a heated chamber within which is mounted a reciprocable heated hollow plunger or ram having a ram face which contacts said charge. In so doing the charge folds over and flattens against the ram face. The ram then moves forward and as it begins to eject the plastic charge into an adjoining mold cavity, an instantaneous cooling of the ram face takes place and also of the plastic charge in contact therewith but without the formation of blemishes in the finished article due to folds made in the plastic charge as the ram advances the charge in the chamber toward the mold cavity. The aforementioned method and a novel apparatus for carrying out this method will be set forth in greater detail in the following description taken in conjunction with the accompanying drawings in which:

FIG. 1 is a vertical cross-sectional of the apparatus of the present invention;

FIG. 2 is similar to FIG. 1 but shows a further step in the operation of said apparatus;

FIG. 3 is similar to FIG. 2 but shows a still further step in the operation of the apparatus; and FIG. 4 is a vertical cross-scetional view taken on line 4—4 of FIG. 1.

Referring particularly to FIG. 1 there is shown an injection ram assembly 1 comprising a ram 7 and heated chamber 11 having a channel 3 leading to a mold cavity 2 in which the article would be formed. The injection ram assembly 1 has a head section 4 mounted on a plate 5 which is threaded to the top of a piston 6 that is reciprocably operated by conventional hydraulic means (not shown) which are well known in this type of plastic injection molder. Mounted within head section 4 is ram 7 which consists essentially of three concentric tubes designated as an outer tube 8, middle tube 9 and inner tube 10. Ram 7, which operates within chamber 11, has a face 12 made of a thin heat conductive metal such as aluminum. A hot fluid, such as steam or hot water, from a source (not shown) is introduced by pipe 14 into the channel 13 formed between outer tube 8 and middle tube 9 and ultimately passes out through pipe 15 as shown by arrows. In addition outer tube 8 is mounted on springs 16 and accordingly is capable of reciprocable movement. Whereas tube 8 is movable, tubes 9 and 10 are fixed and are connected to a source (not shown) of cold water by means of pipe 17. The cold water moves lengthwise in channels 18 and 19 and ultimately out through pipe 20. Hot plastic P for molding enters chamber 11 through channel 23 located in feeder plate 21 which is heated by electrical elements (not shown) mounted in feeder plate 21 as is well known in the art. Examples of heating element which have been found suitable are chromolox cartridge heaters, Type C-405 (240 volt–450 watts).

In operation a measured amount of hot plastic P is fed into chamber 11 by means of feeder channel 23. Ram 7 is then moved to the right by the hydraulic means (not shown) operating through piston 6 and plate 5 while hot water is circulated through channel 13 and cold water through channels 18 and 19. When the ram 7 reaches the position shown in FIG. 2 such that plastic P is about to enter channel 3 leading to the mold cavity 2, sufficient back pressure against ram face 12 begins to be exerted by plastic P so that outer tube 8 which has a flange 8' which normally contacts shoulder 4', is caused to move backward, in spite of the counteraction of springs 16, so as to close the opening of pipe 14 into channel 13 as shown by FIG. 3. The face 22 of tube 9 is now in contact with face 12 of tube 8. Since only cold water is circulating through channels 18 and 19, faces 22 and 12 are immediately cooled. As a result that surface of plastic P in contact with face 12 is immediately chilled and set such that there are no folds in the plastic mass P as it was moved forward by ram 7 as it moved from the position of FIG. 1 to the position of FIG. 2. Consequently no fold marks are imparted to the plastic mass P since no substantial chilling of the plastic occurs until the plastic is ready for introduction into the mold cavity as shown by FIG. 3. Therefore, when the ram 7 is caused to move to its furthermost forward position, the plastic P passes into the mold cavity 2 without any fold marks therein to impart blemishes to the surface of the finished article which is adjacent to the ram face 12.

FIG. 4 shows the manner in which the incoming cold and hot fluids are caused to pass longitudinally along tubes 8, 9 and 10 to face plates 12 and 22 due to the presence of flanges 24 and 25 which extend lengthwise of said tubes.

From the foregoing description it will be apparent that there has been devised a novel method and apparatus whereby blemishes in the finished molded article, which are due to the folding over of the plastic mass as it is moved forward in the chamber by the ram, are eliminated.

While the illustrative embodiments of the invention have been described hereinbefore with particularity, it will be understood that various other modifications will be apparent to and can readily be made by those skilled in the art without departing from the scope and spirit of the invention.

I claim:
1. The method of forming a plastic article free from fold blemishes comprising introducing a hot plastic charge into a chamber, moving said charge by means of a heated ram in contact therewith into a mold cavity, qiuckly cooling said heated ram as the charge enters said opening and thereafter continuing to move the plastic charge into the cavity by said ram so as to form the article.

2. In a method of making a plastic article in a mold cavity by depositing plasticized thermoplastic material in a passage communicating with the mold cavity and then advancing a ram through the passage in a single uninterrupted stroke to fill the mold cavity with the material and to subject the material in the cavity to molding pressures and temperatures, the steps of initially heating the material-contacting portions of the ram to a temperature such that the plasticized material is not appreciably chilled during its displacement into the mold cavity and thereafter rapidly chilling said ram portions during the advancing stroke of the ram in response to the resistance to continued ram displacement after the mold has been substantially filled to aid in chilling the plasticized material in the mold.

3. In a method of making a plastic article in a mold cavity by depositing a body of plasticized thermoplastic material in a passage communicating with the mold cavity and then advancing a ram in the passage into contact with the material (1) to displace the material toward and into said mold cavity and (2) to subject material in the cavity to a molding pressure, the steps of controlling the temperature of the material-contacting portions of said ram by (1) heating said ram portions to a temperature such that the thermoplastic material is not appreciably chilled to a non-plastic state and (2) subsequently chilling said ram portions, the transition from said heating step to said chilling step being made in response to an increase in the resistance of said material to displacement during filling of said cavity.

4. In an injection molding apparatus including a mold cavity communicating with a supply passage, a material-supplying means for depositing a measured charge of plasticized material in said passage in spaced relation to the mold cavity, the improvements of a ram reciprocable in said passage to displace said charge of material into said cavity and to subject material in the cavity to molding pressures, comprising a generally cylindrical hollow outer ram sleeve, means closing one end of the ram sleeve and defining a material-contacting face for the ram, means subdividing the interior of said ram sleeve into a plurality of internal flow passages for selectively subjecting the ram end face to hot and cold heat exchange fluids, respectively, and means for supporting said ram sleeve and said subdividing means for relative displacement to subject the ram end face to said hot and cold fluids, respectively.

5. In a method of making a plastic article in a mold cavity by depositing a body of flowable plastic material in a passage communicating with the mold cavity and then advancing a ram in the passage into contact with the material (1) to displace the material into said mold cavity and (2) to subject the material in the cavity to molding pressures, the steps of controlling the temperature of the material-contacting portions of said ram by (1) initially maintaining said ram portions at a temperature such that the body of flowable plastic material is not appreciably chilled and (2) subsequently chilling said ram portions after the material has been displaced into the mold and continuing through the period during which the material is subjected by the ram to said molding pressures to thereby shorten the forming time by reducing the ram holding time necessary to formation of a smooth blemish-free plastic surface.

6. In an injection molding apparatus including a mold cavity communicating with a supply passage, a material-supplying means for depositing a measured charge of plasticized material in said passage in spaced relation to the mold cavity, the improvements of a ram reciprocable in said passage to displace said charge of material into said cavity and to subject material in the cavity to molding pressures, comprising a generally cylindrical hollow outer ram sleeve, means closing one end of the ram sleeve and providing a material-contacting face for the ram, internal flow passages for supplying hot and cold heat exchange fluids, respectively, to said ram, and means for supporting said ram and said passage-defining means for relative axial displacement to subject the ram end face to said hot and cold fluids, respectively.

7. In a method of making a plastic article by displacing thermoplastic material in a plastic state into a mold cavity and then chilling said material to a solid state under pressure exerted by a ram end face, the steps of initially heating said ram end face to a temperature at which the flowable plastic material is not appreciably chilled during substantial filling of the mold cavity and thereafter rapidly chilling said ram end face after the mold cavity has been substantially filled and during solidification of the material in the mold cavity.

8. In a method of making a plastic article in a mold cavity by depositing plasticized thermoplastic material in a passage communicating with the mold cavity and then advancing a ram through the passage to fill the mold cavity with the material and to subject the material in the cavity to molding pressures and temperatures, the steps of continuously providing a supply of heating and cooling fluid media to separate portions of the ram, heating the material contacting portions of the ram to a temperature such that the body of flowable plastic material is not appreciably chilled while the mold cavity is being substantially filled by subjecting said portions to the influence of said heating fluid medium essentially absent the influence of the cooling medium, and instantaneously chilling the material contacting portions of the ram after the mold cavity has been substantially filled and during solidification of the material in the mold cavity by subjecting said portions to the influence of the cooling fluid medium essentially absent the influence of the heating fluid medium.

9. In a method of making a series of plastic articles by cyclic displacing plasticized thermoplastic material into a mold cavity and then chilling said material to a solid state under pressure exerted by a ram end face which forms one surface of the mold, steps of (1) continuously supplying heating and cooling fluid media to separate portions of the ram, (2) heating the ram end face to a temperature such that the flowable thermoplastic material is not appreciably chilled while the mold cavity is being substantially filled by subjecting the ram end face to the influence of said heating fluid medium without subjecting the ram end face to the influence of the cooling fluid medium, (3) thereafter instantaneously chilling the ram end face after the mold cavity has been substantially filled and during solidification of the material in the mold cavity by subjecting the ram end face to the influence of the cooling fluid medium without subjecting the ram end face to the influence of the heating fluid medium so as to shorten the article forming time by reducing the ram holding time necessary to formation of a smooth blemish-free plastic surface at the ram end face, and (4) repositioning the ram at its general initial orientation for repetition of steps (2) and (3).

10. In an injection molding apparatus including a mold cavity communicating with the supply passage, a material-supplying means for depositing a measured charge of plasticized material in said passage in spaced relation to the mold cavity, the improvement of a ram reciprocable in said passage to displace said charge of material into said cavity and to subject material in the cavity to molding pressures, comprising means closing one end of the ram to provide a material-contacting face for the ram, heat exchanger means for alternately heating and cooling the ram face and control means for selectively subjecting the ram face to the influence of said heating and cooling heat exchanger means in timed relation to the stroke of the ram.

References Cited by the Examiner

UNITED STATES PATENTS

| | | | |
|---|---|---|---|
| 2,296,296 | 9/42 | Shaw | 18—55 |
| 2,689,376 | 9/54 | Wacker | 264—329 |
| 2,705,342 | 4/55 | Hendry | 18—55 XR |
| 2,801,444 | 8/57 | Lorenian | 264—328 |

ROBERT F. WHITE, *Primary Examiner.*

ALEXANDER H. BRODMERKEL, *Examiner.*